United States Patent
Olivier

(10) Patent No.: US 9,081,906 B2
(45) Date of Patent: Jul. 14, 2015

(54) OFFICE SYSTEM COMPRISING A TELEPHONY APPLICATION

(75) Inventor: Francois Olivier, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 103 days.

(21) Appl. No.: 13/510,674

(22) PCT Filed: Nov. 26, 2010

(86) PCT No.: PCT/FR2010/052541
§ 371 (c)(1),
(2), (4) Date: Jun. 18, 2012

(87) PCT Pub. No.: WO2011/070265
PCT Pub. Date: Jun. 16, 2011

(65) Prior Publication Data
US 2012/0264413 A1 Oct. 18, 2012

(30) Foreign Application Priority Data
Dec. 7, 2009 (FR) ...................................... 09 58703

(51) Int. Cl.
| | | |
|---|---|---|
| H04M 3/00 | (2006.01) | |
| G06F 13/38 | (2006.01) | |
| G06F 3/02 | (2006.01) | |
| G06F 3/038 | (2013.01) | |
| G06F 3/14 | (2006.01) | |

(52) U.S. Cl.
CPC ............ *G06F 13/387* (2013.01); *G06F 3/0227* (2013.01); *G06F 3/038* (2013.01); *G06F 3/1423* (2013.01)

(58) Field of Classification Search
CPC .. H04W 8/245; H04W 88/02; H04M 1/72525
USPC .................. 455/418, 426.1, 426.2, 557, 414.1
See application file for complete search history.

(56) References Cited

U.S. PATENT DOCUMENTS

| | | | |
|---|---|---|---|
| 5,671,366 A | 9/1997 | Niwa et al. | |
| 6,044,422 A | 3/2000 | Tran | |
| 6,460,109 B1 * | 10/2002 | Kaply et al. | 710/316 |
| 7,098,899 B1 | 8/2006 | Ginosar | |
| 2003/0105825 A1 * | 6/2003 | Kring et al. | 709/206 |
| 2003/0142631 A1 * | 7/2003 | Silvester | 370/252 |
| 2004/0243484 A1 * | 12/2004 | Smith | 705/27 |
| 2005/0227763 A1 * | 10/2005 | Lum et al. | 463/37 |
| 2007/0036134 A1 * | 2/2007 | Huang et al. | 370/352 |

FOREIGN PATENT DOCUMENTS

JP 2007328462 12/2007

* cited by examiner

*Primary Examiner* — Nghi H Ly
(74) *Attorney, Agent, or Firm* — Patti & Malvone Law Group, LLC

(57) ABSTRACT

An office automation system comprising a portable computer (1) that comprises a processing unit (2) capable of executing at least one preferential application (T), one integrated output means (3) and one integrated input means (4), said office automation system further comprising an additional output means (5) which may selectively be connected to said portable computer (1) and an additional input means (6) which may selectively be connected to said portable computer (1), wherein either said integrated output means (3) and input means (4), or said additional output means (5) and input means (6), are reserved for the preferential application (T) when said additional output means (5) and input means (6) are connected to said portable computer (1), in accordance with a "fixed" mode.

16 Claims, 1 Drawing Sheet

OFFICE SYSTEM COMPRISING A TELEPHONY APPLICATION

TECHNICAL FIELD

The present invention relates to an office automation system capable of executing a preferential application, such as a telephony application, and particularly an optimal use of a portable computer.

BACKGROUND

In the field of telephony, it is known how to execute a client telephony application capable of managing a connectivity with a telephony server in order to offer a user communication/telephony services via peripheral input and output means. These services primarily concern voice and/or video calls. It is possible to secondarily add optional media services, such as short messages or SMS, instant messaging or IM, chatting, e-mail, music or MP3 playing, and video playing.

Currently, one such telephony application may be executed on an office telephony terminal. Such a terminal typically comprises a central processing unit (CPU), a display monitor, a keyboard, and an audio headset that comprises a speaker/earpiece and at least one microphone. Such a terminal, dedicated to the telephony application, has proven highly effective. However, such a terminal may become costly, particularly when it is advantageously equipped with high-quality interfaces (wide color screen, touchpad, number pad and alphanumeric keypad, large-band speaker, omnidirectional microphone, etc.) which limits the number of users who may be equipped with such a terminal. Additionally, such a terminal designed for the office does not allow for any mobility.

Such a telephony application may be executed on a computer, for example a portable one, which emulates, using standard peripherals, the specific peripherals of a telephone terminal, and particularly the keypad and audio handset. One drawback of such an approach is that the computer also executes other applications at the same time as the telephony application. In such a case, the computer's input and output means/peripherals are shared between the telephony application and the other applications. This way, in a conventional manner within a multiwindow operating system, one window is associated with the telephony application. This window is not necessarily always visible. Automatically making it visible during a phone call disrupts the desktop's organization and the running of other applications. Competing for access to the computer's input and output means causes a loss of efficiency, both for the telephony application and for the other applications.

It is conceivable to apply the invention to any type of preferential application that may benefit from reserving input or output peripherals. Thus, any application which, for efficiency reasons, can benefit from having dedicated input/output means, is a candidate to be a preferential application.

An intermediate solution is therefore sought, which would make it possible to avoid the drawbacks of these two approaches. The problem which the invention attempts to resolve is finding a solution that would make it possible to offer input and output means dedicated to a preferential application, though without making use of a dedicated terminal.

To do so, it should be noted that more and more users are equipped with portable computers that offer processing capabilities, human-machine interfaces, and mobility which improve day by day. This portable computer, which may be a notebook, a laptop, a subnotebook, or a mini-PC with a touchpad, offers ever-increasing processing capability in a constantly shrinking size. One benefit of this reduction in size is that it encourages mobility. One drawback of this reduction in size, however, is that it also reduces the size of the input and output means integrated into the portable computer, and thereby reduces ergonomics and work comfort for the user.

Thus, it is increasingly frequent, when the portable computer is in an office environment, to connect additional, more comfortable input means to it, such as a full-size keyboard, an additional output means, such as a full-size screen and/or a better-quality speaker system, in order to replicate the comfort of a desktop computer, in a mode that shall be termed "fixed" mode.

Otherwise, the input and output means integrated into the portable computer are only used when the portable computer is not on a desktop, and is in "mobile" mode.

SUMMARY

The invention may be implemented in such an office automation system, comprising a portable computer that comprises a central processing unit capable of executing at least one preferential application, an integrated output means and an integrated input means, an additional output means that may be selectively connected to said portable computer, and an additional input means that may selectively be connected to said portable computer.

The inventive office automation system is such that either the output and input means integrated into the portable computer, or the additional output and input means, are reserved for the preferential application when said additional output and input means are connected to said portable computer. This corresponds to the "fixed" mode that may be implemented in an office environment.

According to another characteristic of the invention, whenever the additional output and input means are not connected to said portable computer, the office automation system thereby being in "mobile" mode, the integrated output and input means are shared between the preferential application and other applications that may exist.

According to another characteristic of the invention, the office automation system is capable of automatically switching modes between "fixed" and "mobile" mode and vice versa, by automatically detecting the connected or disconnected state of the additional output and input means.

One advantage of the inventive device is offering an interface dedicated to the preferential application, which is therefore more efficient, without requiring investment in any particular terminal.

Another advantage of the inventive device is offering a continuity solution between in-office operation in "fixed", connected mode and out-of-office operation in "mobile", disconnected mode.

According to another characteristic of the invention, the preferential application is a telephony application.

DESCRIPTION OF THE DRAWINGS

Other characteristics, details, and advantages of the invention will become more clearly apparent from the detailed description given below by way of example with reference to the drawings, in which.

Figure 1:
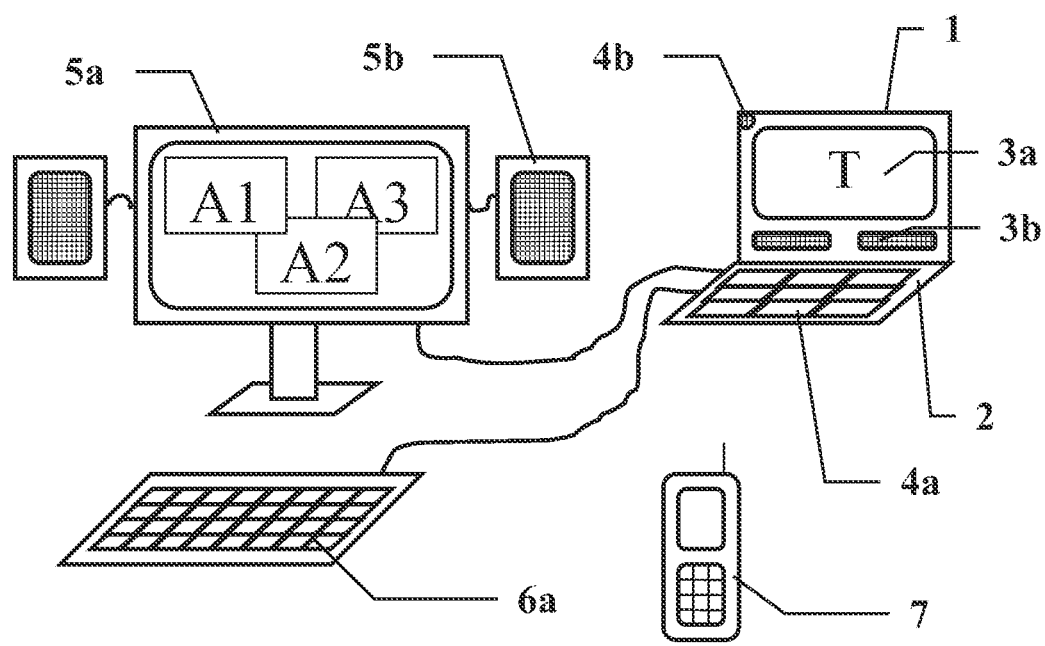
FIG. 1 depicts an office automation system according to the invention in "fixed" mode.

As previously indicated and as depicted in FIG. 1, the office automation system according to the invention comprises a portable computer 1. Said portable computer 1 comprises a generically designed integrated output means 3 that comprises the components 3a, 3b, etc. and a generically designed integrated input means 4 that comprises the components 4a, 4b, etc. The generically designed integrated output means 3 has output components 3a and 3b that are a part of the portable computer without an external connection medium. Also, the generically designed integrated input means 4 has input components 4a and 4b that are a part of the portable computer without an external connection medium. The system comprises a central processing unit or CPU 2, which is typically the central processing unit of the portable computer 1. This central processing unit 2 is capable of executing, in a known manner, at least one preferential application T, as well as multiple other software applications A1, A2, A3.

In order to improve comfort of use, when the user is at the office, said portable computer 1 may be connected to a generically designed additional output means 5 (comprising the components 5a, 5b, etc.) and/or to a generically designed additional input means 6 (comprising the components 6a, etc.)

In systems of the prior art, such connection of additional means takes place only through a "parallel" connection of an integrated output means 3, or respectively an integrated input means 4, and an additional output means 5, or respectively an additional input means 6. Thus, for example, the display that appears on an integrated monitor 3a is the same as the display that appears on an additional monitor 5a, or alternatively the display that appears on a monitor shows an extension of the display area shown on the other monitor. Likewise, pressing a key on an integrated keyboard 4a produces the same action as pressing on the corresponding key on additional keyboard 6a.

On the other hand, according to one essential characteristic of the invention, when the office automation system is in "fixed" mode, meaning when an additional output means 5 and an additional input means 6 are connected to the portable computer 1, the office automation system is such that either the integrated output means 3 and the integrated input means 4, or the additional output means 5 and the additional input means 6 are reserved and dedicated exclusively to the preferential application T. This ensures that said means thereby reserved are constantly visible and/or available, so that the user can interact with the preferential application T.

Otherwise, the unreserved output means and the unreserved input means may be used by the other applications A1, A2, A3.

Figure 2:
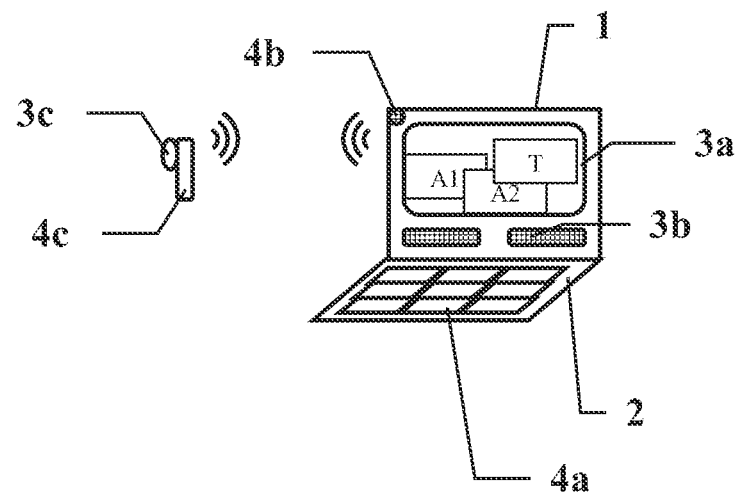
FIG. 2 depicts the same office automation system in "mobile" mode.

Referring now to FIG. 2, the same office automation system is shown when it is disconnected. Such a configuration corresponds to the situation in which the user of said portable computer 1 is not in an office environment. In this so-called "mobile" mode, the portable computer 1 may not be connected to the additional means and is in such a case used via its integrated output means 3 and its integrated input means 4, both for the preferential application T and for the other applications A1, A2, A3, which share said integrated means 3, 4. It may be noted that this mobile mode is similar to the usage according to the prior art of a portable computer 1 that simultaneously executes a preferential application T and at least one other application A1, A2, A3

According to one advantageous characteristic of the invention, the office automation system may be capable of automatically switching modes between "fixed" mode and "mobile" mode, and vice versa. This mode-switching between a "fixed" mode in which the reserved means are dedicated to the preferential application T and a "mobile" mode in which the integrated means 3, 4, the only ones available, are shared between all the applications may be carried out automatically based on the connected or disconnected status of the additional means 5, 6. Said connected or disconnected status may be automatically detected by the portable computer 1 whenever a new connection or disconnection is performed. Thus, detection may, for example, be achieved by standard interfaces: microphone, speaker, or audio headset jack, which owing to the connection protocols that are used (USB, BT, etc.), are commonly capable of detecting a connection or disconnection.

One particularly beneficial example of a preferential application is that of a telephony application.

In order to be able to execute the interface functions of a telephony application T, the reserved output means 3, 5 comprise at least one audio playback means 3b, 3c, 5b. This audio playback means 3b, 3c, 5b may be at least one speaker or earpiece such as a headset 3c, 5c, potentially a wireless one, or a set of headphones. This means makes it possible to play the sound elements of a telephone call. The reserved output means 3, 5 further advantageously comprises a display means 3a, 5a of the monitor type. This display means 3a, 5a is used by the telephony application T to display the dialog components of the telephony application T with the user: menus, status display, application configuration, etc. in connection with the operations of the users on the reserved input means 4, 6. It may also be used to play a video in the context of a video communication or an MMS.

Likewise, the reserved input means 4, 6 comprises at least one sound capture means 4b. This sound capture means 4b may be a microphone. This microphone may, in the event that the input means is the integrated input means 4, be integrated into the portable computer 1 as depicted, combined with a set of headphones (not depicted) or with a headset 4c. It enables the capturing of the user's voice sound elements for a telephone call. The reserved input means 4, 6 also advantageously comprises a selection means 4a, 6a. This selection means may be a keyboard as depicted, and/or a pointing device in connection with the display 3a, 5a which may be a mouse, pad, joystick, or touchpad. This selection means 4a, 6a is used by the user to indicate to the telephony application T his or her choices for controlling or configuring said telephony application T. The reserved input means 4, 6 may also comprise a video capture means (not depicted) in the event that the telephony application T is capable of managing video communications.

Thus, the reserved output means 3, 5 and input means 4, 6 comprise at least one sound playback means 3b, 3c, 5b and a sound capture means 4b, 4c for the handling of audio communications. Next, they comprise an additional selection means 4a, 6a that makes it possible to at least reproduce a telephone dialpad with conventional digits and symbols (0-9, *, #, +, etc.) in order to dial as well as to carry out telephony-dedicated functions: calling, hanging up, redialing, etc. Next, they comprise an additional display means 3a, 5a which, in connection with part of the selection means 4a, 6a dedicated to an expanded user dialogue, makes it possible to control and/or configure the telephony application T in order to perform expanded communications functions such as conferences, calling/called party identification and introduction, displaying statistics, managing a directory of contacts, etc.

The additional output means 5 and input means 6 are mainly devoted to computing applications A1, A2, A3, not telephony applications. They are advantageously larger and more comfortable than the corresponding integrated means.

Thus, the keyboard 6a may comprise more keys, with some additional ones devoted to specific functions (e.g. number pad).

Although not strictly necessary, it is increasingly common for the additional output means 5 to comprise an additional sound playback means 5b. This playback means, which may be larger in volume than its integrated counterpart 3b, makes it possible to achieve better sound quality. Thus, it is possible to work while listening to high-quality music.

However, if this additional sound playback means 5b is used in parallel with the integrated sound playback means 3b, the sounds that they emit may be disrupted, and may thereby disrupt the user's listening experience when a voice telephone call (or video call with a voice component) is underway, being handled by the reserved input and output means.

Thus, according to one advantageous characteristic of the invention, the office automation system comprises a control means capable of controlling the unreserved output means. This control is performed at least when the telephony application T is handling a telephone call. This way, once a telephone call that comprises a voice component is initiated by the user (calling party) or presented to the user (called party), this control means may operate the unreserved output means, and particularly the unreserved sound playback means, in order to inhibit or substantially lower its sound volume. Thus, only or mostly the sound coming from the reserved sound playback means remains audible to the user while the telephone call is in progress.

Likewise, according to another embodiment, the system may additionally comprise a mobile telephone 7. This mobile telephone 7 is such that it is capable of being used as a backup for the telephony application T. This way, it may connect to the same telephony server as the telephony application T and is capable of performing the same functions as that application T. In this situation, an incoming call is presented on the mobile telephone 7 and on the portable computer 1 executing the telephony application T. An incoming call will thereby trigger the ringing of both of the possible receivers at the same time: the telephony application T and the mobile telephone 7.

In the event that such a mobile telephone 7 is present, the office automation system is advantageously capable of configuring said mobile telephone 7, particularly depending on whether the mode is "fixed" or "mobile". This way, the office automation system determines for each function whether it must be carried out by the telephony application T, the mobile telephone 7, or both. Thus, returning to the example, an incoming call may, depending on what is chosen, cause the mobile telephone 7 to ring, cause the telephony application T on the portable computer 1 and the reserved means to ring, or cause both at once.

The system may configure the mobile telephone 7 in either of two ways. In the first one, the system may directly dialogue, for example via a wireless connection, with the telephone and configure it to enable/disable each of the communication functions. In the second one, the system only dialogues with the telephone server to which it indicates whether it is serving, during an incoming call, either the telephony application T, or the mobile telephone 7, or both.

Such a configuration in the second way mainly applies in "fixed" mode, in the presence of a telephone server that may be configured by the system. In "mobile" mode, the telephone server is typically a cellular network, such as the GSM network, which cannot always be configured. However, in the event that a telephone application is accessible from the network, such as by using the capabilities of data and/or IMS transmission networks, and this telephone application is configurable, then the two modes "fixed" and "mobile" become one.

Thus, for example, the mobile telephone 7 is advantageously configured to be silent in order to encourage the use of the reserved means, when the system is in "fixed" mode. Otherwise, the mobile telephone 7 retains all of its features (which is identical to a lack of configuration by the system) in parallel with the telephony application T when the system is in "mobile" mode. This way, an incoming call may be handled on the portable computer 1 or on the mobile telephone 7 without disrupting the applications A1, A2, A3 executed on the portable computer 1, whichever the user chooses.

Advantageously, the telephony application T is capable of connecting to a telephone server by any connectivity means, whether wired or wireless, that is available. Thus, it is capable of using different channels, such as IP, Wi-Fi, GSM/3G, etc. This conventionally holds true for the mobile telephone 7, if applicable.

In the preceding description, the invention was particularly illustrated by primary media examples that are voice and/or video communication. This primary media is necessarily particular in that it requires sound output and input means.

However, a telephony application T may also handle secondary media such as SMS, MMS, IM, chatting, e-mail, MP3, and video. This media, which requires more conventional output and input means, and especially since it is less disruptive to the other applications A1, A2, A3 as they are asynchronous, may be configured to be handled by the integrated output 3 and input 4 means or by the additional output 5 and input 6 means, whichever the user chooses, independent of the means reserved for voice telephony. The system thereby comprises configuration means that the terminal, for this secondary media, whether they must be routed towards the integrated means 3, 4 or towards the additional means 5, 6.

The invention claimed is:

1. An office automation system comprising:
   a portable computer that comprises:
      a processing unit capable of executing at least one preferential application and other applications;
      one integrated output means that comprises at least one output component that is a part of the portable computer without an external connection medium;
      one integrated input means that comprises at least one input component that is a part of the portable computer without an external connection medium;
      an additional output means configured to selectively be connected to said portable computer;
      an additional input means configured to selectively be connected to said portable computer; and
   a control means configured to control an unreserved output means when the at least one preferential application handles a video call that is underway;
   wherein either said one integrated output means and said one integrated input means, or said additional output means and said additional input means are reserved for the at least one preferential application, and the other of said one integrated output means and said one integrated input means, and said additional output means and said additional input means are reserved for the other applications, when said additional output means and said additional input means are connected to said portable computer in accordance with a fixed mode; and wherein the reserved output means comprises a wireless component.

2. The office automation system according to claim 1, wherein said one integrated output means and said one integrated input means are shared between the at least one preferential application and the other applications whenever said additional output means and said additional input means are not connected to said portable computer in accordance with a mobile mode.

3. The office automation system according to claim 1, wherein the reserved output means comprises a display means or a wireless playback means.

4. The office automation system according to claim 1, wherein the reserved input means comprises a selection means or a sound capture means.

5. The office automation system according to claim 1, wherein the additional output means and the additional input means are larger than the one integrated output means and the one integrated input means.

6. The office automation system according to claim 1, wherein the control means is configured to control the unreserved output means when the at least one preferential application handles a voice call that is underway.

7. The office automation system according to claim 1, being capable of automatically switching modes between said fixed mode and a mobile mode and vice versa, based on automatic detection of a connected status or a disconnected status of said additional output means and said additional input means.

8. The office automation system according to claim 7, wherein the automatic detection is achieved via a microphone, a speaker, or an audio headset jack.

9. The office automation system according to claim 7, wherein a USB protocol is used to detect the connected status or the disconnected status.

10. The office automation system according to claim 1, wherein the at least one preferential application is a telephony application.

11. The office automation system according to claim 10, further comprising a mobile telephone configured to perform the same functions as the telephony application in parallel, wherein the office automation system is capable of configuring said mobile telephone when the mode is fixed or mobile.

12. The office automation system according to claim 10, wherein the telephony application is configured to connect to a telephone server via various channels selected from the group consisting of IP, Wi-Fi, and GSM/3G.

13. The office automation system according to claim 10, wherein secondary media of the telephony application are configured to be selectively handled by said one integrated output means and said one integrated input means or by said additional output means and said additional input means, and wherein the secondary media of the telephony application comprises SMS, instant messaging, chatting, e-mail, MP3, and video.

14. The office automation system according to claim 10, wherein said additional input means and said additional output means are devoted to applications other than the telephony application.

15. A method for operating an office automation system comprising:

executing at least one preferential application and other applications via a portable computer;

controlling an unreserved output means when the at least one preferential application handles a video call that is underway;

reserving either one integrated output means and one integrated input means, or an additional output means and an additional input means for the at least one preferential application, and the other of said one integrated output means and said one integrated input means, and said additional output means and said additional input means are reserved for the other applications, when said additional output means and said additional input means are connected to said portable computer in accordance with a fixed mode, wherein the reserved output means comprises a wireless component, and wherein the one integrated output means comprises at least one output component that is a part of the portable computer without an external connection medium, and wherein the one integrated input means comprises at least one input component that is a part of the portable computer without an external connection medium;

sharing said one integrated output means and said one integrated input means between the at least one preferential application and the other applications whenever said additional output means and said additional input means are not connected to said portable computer in accordance with a mobile mode; and automatically switching modes between said fixed mode and said mobile mode and vice versa, based on automatic detection of a connected status or a disconnected status of said additional output means and said additional input means.

16. An office automation system comprising:
a portable computer that comprises:
 a processing unit capable of executing multiple preferential applications and multiple other applications;
 one integrated output means that comprises at least one output component that is a part of the portable computer without an external connection medium;
 one integrated input means that comprises at least one input component that is a part of the portable computer without an external connection medium;
 an additional output means configured to selectively be connected to said portable computer;
 an additional input means configured to selectively be connected to said portable computer; and
 a control means configured to control an unreserved output means when the at least one preferential application handles a video call that is underway;
wherein either said one integrated output means and said one integrated input means, or said additional output means and said additional input means are reserved for at least one preferential application when said additional output means and said additional input means are connected to said portable computer in accordance with a fixed mode, and wherein the reserved output means comprises a wireless component.

* * * * *